United States Patent Office 3,342,283
Patented Sept. 19, 1967

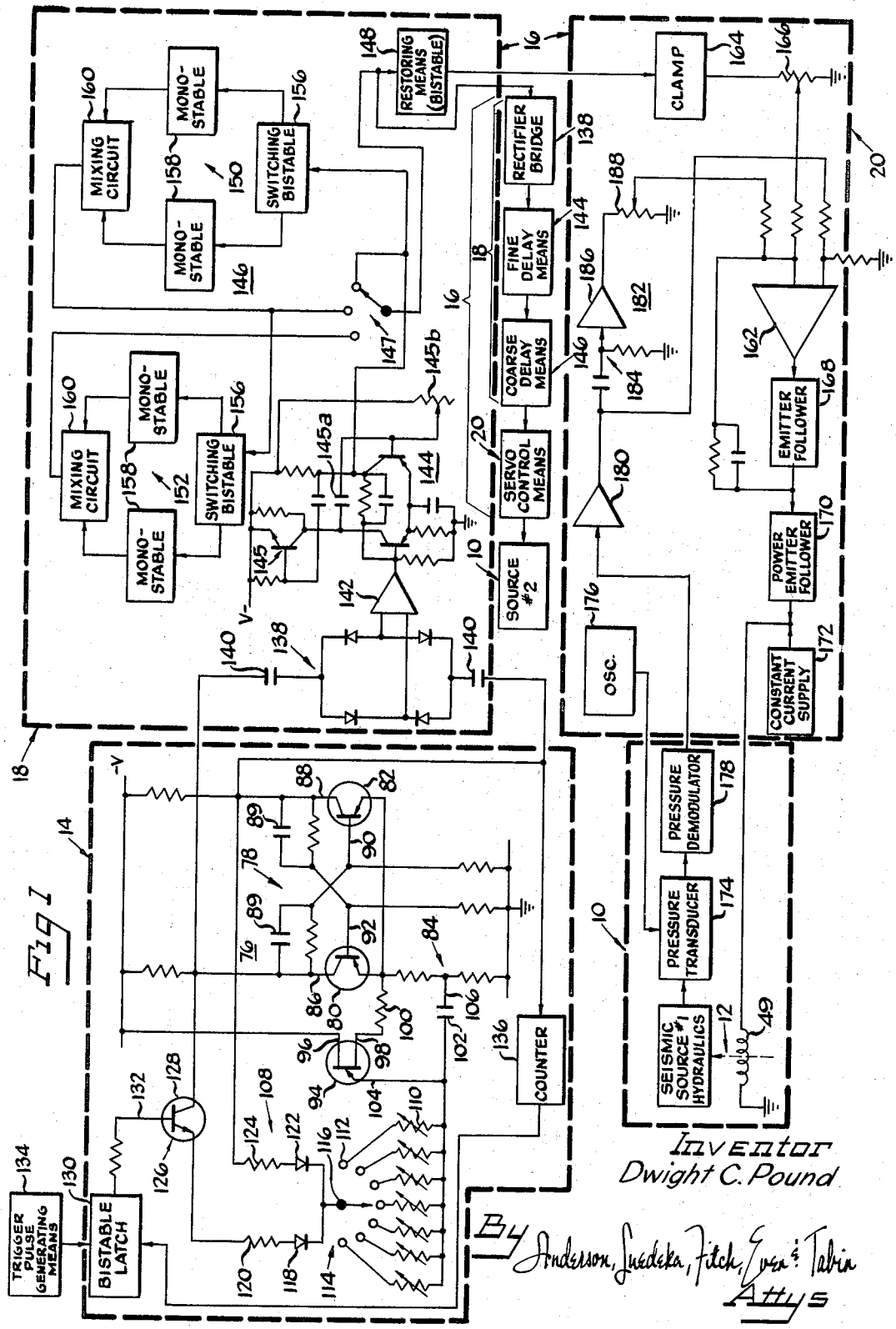

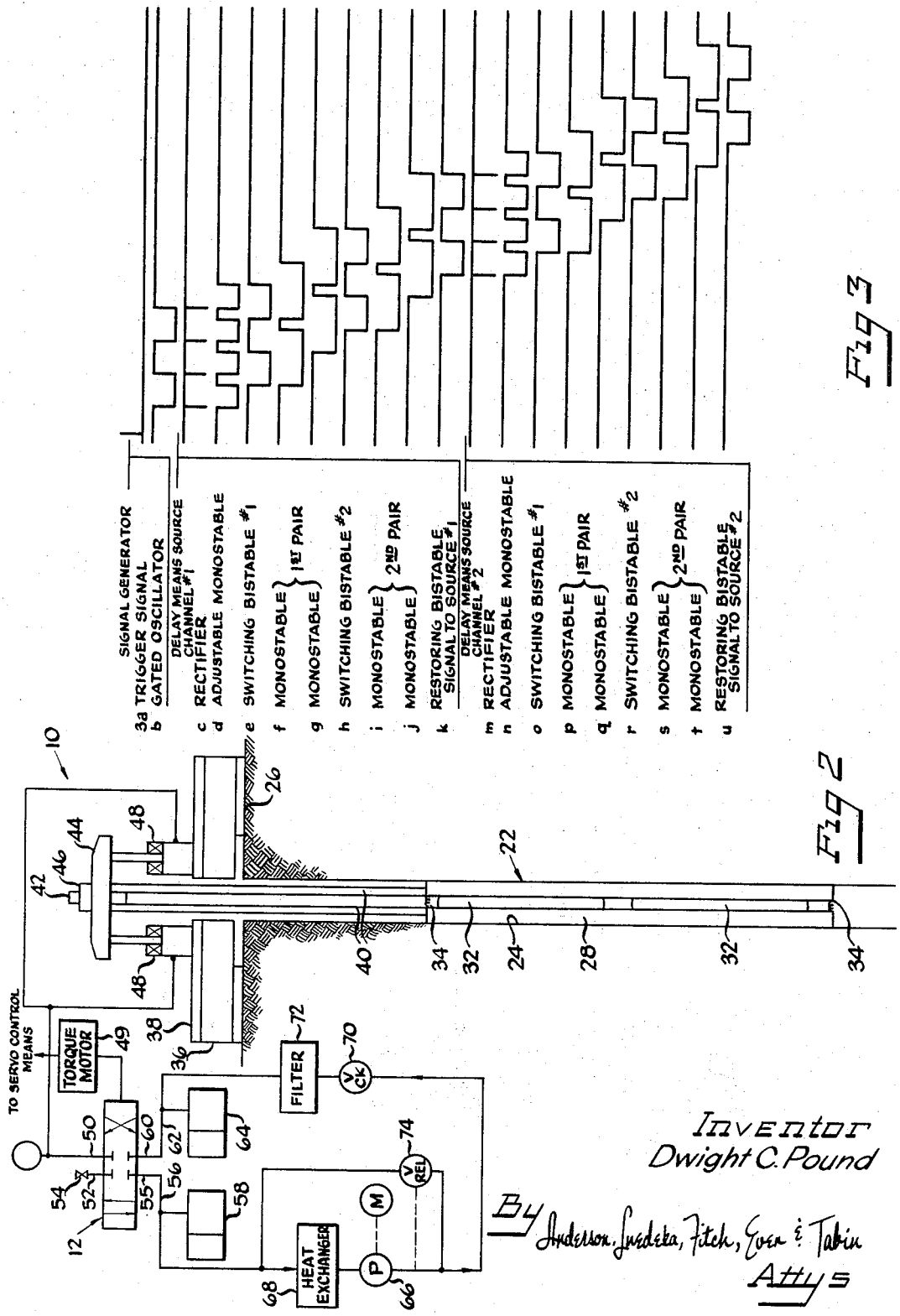

3,342,283
CONTROL APPARATUS UTILIZED TO PRODUCE A BEAM FROM SEISMIC SOURCES
Dwight C. Pound, Solana Beach, Calif., assignor to General Dynamics Corporation, New York, N.Y., a corporation of Delaware
Filed July 13, 1964, Ser. No. 382,303
5 Claims. (Cl. 181—.5)

The present invention relates to geophysical prospecting and more particularly to apparatus for controlling the operation of seismic sources.

Geophysical prospecting is a technique employed to determine the subsurface structure of the earth, such as the geometry of sedimentary strata. This information is a valuable guide to location of natural resource deposits, such as ore deposits, petroleum deposits, etc. The technique comprises the transmitting of vibratory energy into the earth and recording and interpreting the vibrations that return to the surface after reflection from or refraction along boundaries between geological formations.

In geophysical prospecting background noise from earthquakes, highway traffic, airplanes, earth moving, drilling operations, wind, etc., often makes it difficult to distinguish the useful reflected or refracted signal at the recorder. The reflected or refracted signals may be more easily distinguished from the noise by providing a repetitive source of monochromatic seismic waves. In this connection, if many records are available with the same time signal superimposed on a random noise background, the signal may be extracted from the noise by well-known statistical methods. Also, by operating the source at various frequencies and at various numbers of cycles, the extraction of the signal from the noise is facilitated. This is especially true if one wishes to interpret interference patterns.

Another technique which has been employed to discriminate against noise or improve the signal-to-noise ratio is the provision of an array of seismic sources. Such seismic sources have been "fired" simultaneously to provide seismic waves in a predominantly downward direction. This has provided relatively good data in certain areas. However, better data may be obtained, especially in areas of steep dips in the strata, by focusing the seismic waves into a beam. This is done by adjusting the phase of the signals generated by the respective seismic sources. The phases are adjusted to aim the beam in various directions on successive shots in order to explore the structure in all directions from the array.

It is an object of the present invention to provide apparatus for controlling the operation of seismic sources. Another object of the invention is to provide apparatus for controlling the operation of an array of seismic sources. Still another object is the provision of control apparatus which is capable of operating seismic sources so as to provide seismic waves of predetermined frequency and number of cycles. A further object is the provision of control apparatus for an array of seismic sources, which apparatus can be adjusted to focus the seismic waves into a beam which can be aimed in a selected direction. A still further object is the provision of control apparatus for seismic sources which is versatile and relatively simple to operate.

Other objects and advantages of the present invention will become apparent by reference to the following description and accompanying drawings.

In the drawings:
FIGURE 1 is a schematic block diagram of one embodiment of control apparatus for seismic sources; and
FIGURE 2 is a schematic diagram of one of the seismic sources; and FIGURE 3 shows the timing diagram of the control apparatus shown in FIGURE 1.

In general, the control apparatus shown in the drawings is employed for controlling the operation of an array of seismic sources 10, only two of which are shown for purposes of illustration. A suitable seismic source is that shown and described in the copending application of Park H. Miller, Jr., Dwight C. Pound and Herschel R. Snodgrass, Ser. No. 382,304 filed July 13, 1964 for Method of and Apparatus for Generating Seismic Waves. Each seismic source 10 is actuated by hydraulic pressure which is controlled by an electrically actuated valve 12. The control apparatus includes means 14 for generating a signal in response to a trigger signal, which generated signal has a predetermined frequency and number of cycles. The output of the signal generating means 14 is coupled to a plurality of driver circuits 16, one of which is associated with each valve. Each driver circuit 16 includes a delay means 18 having its input coupled to the output of the signal generating means 14 and a servo control means 20 having its input coupled to the output of the delay means 18 and its output coupled to the valve 12. Each delay means 18 is capable of delaying the generated signal from the generating means 14 a predetermined length of time. The delay means 18 is adjusted so that the waves generated by the sources are focused into a composite directed beam.

More specifically, in the illustrated embodiment, seismic waves are generated by an array of the hydraulically actuated seismic sources 10. As shown in FIGURE 2 each source 10 generates seismic waves by compressing earth between a lower anchor 22 disposed in a hole 24 in the earth and a large force plate 26 on the surface of the earth.

The lower anchor 22 is a pneumatically actuated expander which applies pressure to the side wall of the hole 24 to thereby securely grip the earth. The expander 22 typically includes three rigid elongated arcuate shoes 28 which in combination generally conform to the shape of a cylinder. The shoes 28 are forced apart by means of one or more pneumatically operated cylindrical rubber bladders 32 disposed between the shoes 28. The bladders 32 are kept from extruding between the shoes 28 by suitable means (not shown) such as leaves of metal. The shoes 28 are returned to their retracted position by heavy springs 34 at the top and bottom of the shoes 28.

The illustrated force plate 26 is generally ring shaped and rests on the ground at the top of the hole. The force plate 26 is made with an internal diameter preferably larger than the hole in order to prevent collapsing of the edges of the hole 24. The force plate 26 is stiffened by attaching a plurality of I-beams 36 thereto and attaching a ring shaped stiffening plate 38 to the top of the I-beams 36.

In the illustrated embodiment, the lower anchor 22 and the force plate 26 are linked together by vertically extending tension or connecting bars 40. Each bar 40 is securely connected at its lower end to one of the shoes 28 and at its upper end to a common rod 42. The common rod 42, in turn, is connected to a yoke 44 by means of a collar 46. The yoke 44 is reciprocated vertically by a pair of single acting piston type cylinders 48, one being suitably connected to and below each end of the yoke 44. The hydraulic cylinders 48 are securely mounted upon the stiffening plate 38.

In the illustrated embodiment, the cylinders 48 are operated by a hydraulic system which includes the electrohydraulic servo valve 12 which is a two stage, closed center, four-way sliding spool operated by a torque motor 49. The cylinders 48 are connected to a common controlled port 50 of the servo valve, the other controlled port 52 of the valve 12 being blocked by suitable means 54, such as a plug. The exhaust port 55 of the valve is connected by an exhaust line 56 to a suitable reservoir 58, such as a low pressure accumulator.

The inlet port 60 of the servo valve 12 is connected through a working line 62 to a source 64 of pressurized hydraulic fluid which, in the illustrated embodiment, is a high pressure accumulator charged by a high pressure pump 66. The inlet of the pump 66 is connected through a heat exchanger 68 to the low pressure accumulator 58. A check-valve 70 is provided in the working line 62 to prevent backflow through a filter 72 connected in the line. The pump outlet pressure is regulated by a pressure control type relief valve 74 connected between the outlet of the pump 66 and the inlet to the heat exchanger 68.

In operation of the seismic source, hydraulic pressure is conducted to the cylinder 48 by energizing the torque motor 49 which, in turn, shifts the servo valve 12. The hydraulic cylinders 48 tension the connecting bars 49 thereby vertically stressing the earth between the force plate 26 and the lower anchor 22. The pressure in the cylinders 48 and, hence, the stress on the earth is then modulated by varying the control signal to the torque motor 49. A seismic wave is radiated as the strain in the ground is applied or relieved. By both mathematical analysis and experiment, the force plate 26 is more effective than the lower anchor 22 in radiating compressional seismic waves. Moreover, a greater amplitude wave is radiated downwardly than horizontally, which is desirable for seismic work.

To facilitate the discrimination of signal from noise at the recorder, it is preferable to provide a train of sinusoidal waves. This is accomplished by providing a square wave signal having a number of cycles to the servo control means 20, which in turn, is coupled to the torque motor 49. The frequency response of the source 10 is such that even though the signal is a square wave, sinusoidal seismic waves are generated.

In the illustrated apparatus, symmetrical square wave signals (such as that shown in FIGURE 3b) are generated by the signal generating means 14 which includes an oscillator 76 gated by a trigger signal (such as that shown in FIGURE 3a). The gated oscillator 76 includes a transistor bistable multivibrator 78 which, as shown in FIGURE 1, may be a conventional saturated flip-flop type wherein a pair of p-n-p transistors 80 and 82 have a common emitter resistance 84 and the collectors 86 and 88 thereof are cross coupled by timing circuits 89 to the bases 90 and 92 thereof.

The bistable multivibrator 78 is switched between states of operation by applying a signal to the common emitter resistance 84 (emitter triggering). The signal is applied to the emitter resistance 84 by the firing of a unijunction transistor 94 connected as a relaxation oscillator. In this connection base one of 96 of the unijunction transistor 94 is coupled to a negative voltage connection and base two 98 thereof is coupled through a resistor 100 to the emitter resistance 84.

The triggering of the unijunction transistor 94 is determined by the charge build-up on a timing capacitor 102 connected between the emitter 104 of the unijunction transistor 94 and an intermediate junction 106 on the emitter resistance 84 of the multivibrator 78. The charge build-up on the timing capacitor 102 is controlled so as to vary the time of firing of the unijunction 94 and hence the time between changes of state of the bistable multivibrator 78. In this connection, the timing capacitor 102 is connected to the collectors 86 and 88 of the transistors 80 and 82 by means of a variable resistance or frequency control circuit 108. The frequency control circuit 108 includes a plurality of variable resistors 110, one end of each being connected to one of a plurality of contacts 112 on a selector switch 114. The other ends of the variable resistors 110 are connected to the junction of the emitter 104 of the unijunction transistor 94 and the timing capacitor 102.

The selector contact 116 of the selector switch 114 is connected through a first diode 118 and a serially connected fixed resistor 120 to the collector 86 of the multivibrator transistor 80. The selector contact 116 is also connected through a second diode 122 and a serially connected fixed resistor 124 to the collector 88 of the other multivibrator transistor 82. This arrangement provides a means whereby the frequency of the oscillations of the bistable multivibrator 78 may be selected by changing the position of the selector switch 114, and fine adjustments in the frequency may be obtained by varying the variable resistors 110.

The illustrated relaxation oscillator is switched on and off by a transistor switch 126 disposed between one of the collectors 86 and the fixed resistor 120 coupled thereto. More specifically, the collector-emitter circuit of an n-p-n transistor 128 is connected in series with the fixed resistor 120 and the first diode 118. By thus placing the switch in one of the branches of the charging circuit of the timing capacitor 102, the unijunction transistor 94 fires at a time such that the first change of state of the bistable multivibrator 78 occurs one-half period after the transistor switch 126 conducts. Also, this positioning of the transistor switch 126 ensures that, when the switch is shut off, the bistable multivibrator 78 always returns to the same state of operation.

The transistor switch 126 is switched on and off by a bistable multivibrator 130 (hereinafter referred to as the "bistable latch"), which may be of the conventional type. One of the outputs of the bistable latch 130 is connected to the base 132 of the transistor switch 126 so as to cause the transistor switch 126 to conduct when the bistable latch 130 is flipped to its state of operation that provides a signal on that output (hereinafter referred to as the start state). The bistable latch 130 is flipped to its start state by a trigger pulse applied to one of its inputs and is flipped to its other or stop state by a trigger pulse applied to the other input. The start trigger pulse (see FIGURE 3a) is generated by suitable means 134 such as a manual contact closure, a pulse generated by a remote source (e.g., a recorder), an automatic repetitive pulse, etc. In certain applications, the start trigger pulse may be delayed by suitable means to provide a certain timing of the initiating of oscillations of the gated oscillator 76.

In a preferred use of the invention, the described control apparatus is part of a seismic prospecting system including a recorder of the magnetic drum type having a plurality of recording channels axially displaced along the surface of the drum, and rotating at a constant velocity to provide a recording period of several seconds. A particular point in the recorder cycle may be used as a reference datum or "time zero." This point may be identified and signified by a time marker coupled to the recorder drum, e.g., by a micro-switch closing a circuit, which operates at that point in the cycle to produce a reference pulse indicative of the reference datum or time zero. In this form of the invention, the trigger pulse generator means 134 comprises this micro-switch. The reference pulse may then be applied to the control system to initiate its operation. As noted above, it is desirable in some applications to control the time of application of this pulse to the control system in order that the beginning of the seismic wave occur at a particular time after time zero or the reference datum. This beginning of the wave train produced by the seismic sources may be adjusted relative to the reference datum by a conventional adjustable time delay mechanism such as a monostable multivibrator of adjustable period or an oscillator and counter operated as an electronic clock. A different delay for each frequency may be provided.

In the illustrated embodiment the bistable latch 130 is flipped to its stop state when a preselected number of pulses have been generated by the gated oscillator 76. The number of pulses generated by the gated oscillator 76 is counted by a digital counter 136, which may be of the conventional type which produces an output upon receipt of a preselected number of pulses. The input of the counter is connected to the output of the gated oscillator 76. The bistable latch 130 is switched to its stop state by connecting its stop input to an output of the counter 136 which is activated when a preselected number of pulses is counted by the counter 136. The preselected number is adjustable so that the length of the train of pulses may be separately determined for each frequency.

As previously indicated, the output signal or square wave signal generated by the signal generating means 14 (see FIGURE 3b) is coupled to the delay means 18 associated with each of the seismic sources 10. The delay means 18 is capable of introducing a preselected delay in the square wave signal before the same is applied to the associated seismic source 10. In general, as shown in FIGURE 3, the delay means 18 breaks the square wave signal into discrete events, one for each transition of the square wave signal, gives each event an equal time delay, and reconstructs the symmetrical square wave signal from the delayed events. More specifically, the delay means 18 includes a full wave rectifier bridge 138 which receives the symmetrical square wave signal from the gated oscillator 76 and converts it into a series of pulses all of the same polarity, one for each transition of the square wave (see FIGURE 3c). The output pulses from the full wave rectifier bridge are the discrete events to be delayed.

The illustrated full wave rectifier bridge 138 includes a conventional bridge circuit formed with a diode in each leg thereof. The collectors 86 and 88 of the transistors 80 and 82 forming the bistable oscillator 78 are each connected through a capacitor 140 to one end of the bridge circuit 138.

The discrete pulses at the output of the bridge circuit 138 are connected through an amplifier 142 which may be a transistor coupled as an emitter follower to a means 144 for providing an adjustable fine delay to the discrete pulses. The fine delay providing means 144 includes a monostable multivibrator which is switched into its unstable state by each discrete pulse and has means for adjusting the time of return to its original stable state.

As shown in FIGURE 1, the monostable multivibrator is a conventional transistorized type, designed for rapid recovery and accurate timing on all pulses of a train. The timing accuracy of all pulses in the train is ensured by providing a regenerative discharge circuit 145 for the timing capacitor 145a. The timing of the monostable multivibrator 144 is varied by a potentiometer 145b connected in the biasing circuit of the transistor which is conducting when the multivibrator is in its stable state of operation. The pulses at the output of the fine delay means are shown in FIGURE 3d.

The output from the fine delay means 144 may be connected either to a means 146 for providing a coarse delay of the output signal or through a selector switch 147 to a means 148 for reconstructing the output signal in the shape of the original symmetrical square wave signal. The coarse delay means 146 includes two identical sections 150 and 152 which can be cascaded to provide a long delay of the input signal. Each of the sections 150 and 152 of the illustrated coarse delay means 146 includes an input bistable multivibrator (hereinafter referred to as the "switching bistable") which changes state each time the output signal of the fine delay means 144 switches back to its initial stable state, as shown in FIGURE 3e. The switching bistable 156 may be a conventional transistorized bistable multivibrator. The outputs of the switching bistable are each coupled to a monostable multivibrator 158 which as shown in FIGURES 3f and 3g, switches to its unstable state for a transition in one direction of the input pulse and has adjustable timing of return to its initial stable state. The monostable multivibrators 158 may be of the conventional transistor type similar to the multivibrator 144 in which the timing thereof is obtained by connecting various diverse values of resistance into the biasing circuits of the base of one of the transistors. The timings of the monostables 158 are matched. This may be accomplished by switching equal resistors into the monostable circuits. The outputs from the monostable multivibrators 158 are combined in a mixing circuit 160. The mixing circuit 160 may be a conventional diode-transistor "or" gate.

The output from the mixing circuit 160 is connected either to the second section 152 of the coarse delay means 146 or through the selector switch 147 to the restoring means 148. The second section 152 is also connected to the restoring means 148 by means of the selector switch 147. Thus, by moving the selector switch 147, the timing of the delay applied to the discrete events is selectable. In this connection, the discrete events may be subjected to a fine delay, or a fine delay plus a coarse delay, or a fine delay plus a coarse delay plus a second coarse delay.

The delay circuits require a certain amount of time to recover to their normal states. It has been found convenient to use circuits requiring 10% of their duty cycle to recover, hence permitting delays up to 90% of the duty cycle. The time delay may thus be adjusted for any delay from zero to 90% of the duty cycle. For the arrangement described above this permits selection of any delay from zero to 2¼ times the period of the oscillator 76. Selection may be made by adjustment of the timing circuits of the monostable multivibrators 144 and 158.

As previously indicated, the delay discrete events are reconstructed in the shape of the original symmetrical square wave by the restoring means 148. The restoring means 148 may be a conventional transistorized bistable multivibrator, which switches state for each pulse applied thereto, as shown in FIGURE 3k. In the illustrated embodiment, the square wave signal at the output of the restoring means 148 is coupled to the servo control means 20 and also to the driver circuit 16 associated with a second seismic source 10. The driver circuit for the second source is similar to the driver circuit for the first source. The timing of the delay means of the second source are shown in FIGURES 3m to 3u. The output of the delay means of the second source is, in turn, coupled to the delay means associated with a third source, and so forth, until the delay means associated with all the sources are cascaded. In this way, the signal applied to the respective servo control means may be delayed with respect to that applied to previous servo control circuits.

In the illustrated embodiment, the servo control means 20 couples the square wave output signal from the delay means 18 to the torque motor 49 of the electro-hydraulic servo valve 12 of the seismic source 10. Generally, the servo control means 20 is a closed loop servo control circuit wherein the square wave signal is coupled to the input of a differential amplifier 162 along with a signal proportional to the pressure applied to the cylinders 48 of the seismic source 10 and a time derivative of the pressure. The time derivative and the signal proportional to the pressure applied to the cylinders 48 are feed-back signals which tend to increase the performance of the system in the normal frequency range of operation of the seismic source.

In the illustrated embodiment, the summing circuit 162 is a conventional differential operational amplifier having a frequency response which is substantially flat from D-C to 10 kc. and has a good D-C stability. The output from the restoring means 148 is coupled through a clamping circuit 164 which references the output signal from the restoring means 148 to ground and standardizes its amplitude. In this connection, the clamping circuit 164 may include a transistor coupled as an emitter follower, the collector of which is referenced or clamped to a predetermined voltage by a Zener diode. The D-C square wave output from the clamping circuit 164 is coupled to a potentiometer 166 which permits adjustment of the amplitude of the square wave signal applied to one of the inputs of the differential amplifier 162. The feed-back signal which is a D-C signal proportional to the pressure applied to the cylinders 48 is applied to the other input of the differential amplifier 162. The time derivative feed-back is applied to the same input as the square wave signal.

The differential amplifier 162 amplifies the difference in the input signals. The output of the differential amplifier is coupled through a pair of D-C amplifiers 168 and 170 to the coil 49 of the solenoid valve 12. The first amplifier may be a conventional complementary symmetrical emitter follower. A feed-back signal is obtained at the output of the first amplifier 168, which feed-back signal is coupled to the square wave input of the differential amplifier to stabilize the same.

The torque motor 49 of the valve 12 is connected to the output of the second amplifier 170 in such a way as to be driven in a negative direction (i.e., cylinder pressurizing direction) by an increase in the output of the second amplifier 170. In this connection, the coil 49 may be connected as the emitter resistor of an emitter follower coupled p-n-p transistor serving as the second amplifier. The coil 49 is driven in a positive direction (i.e., cylinder depressurizing direction) by a constant current source 172 connected thereto. The constant current source 172 may be a conventional series transistorized current regulator.

In the illustrated embodiment, the pressure supplied to the cylinders 48 is sensed by a pressure transducer 174. The illustrated pressure transducer 174 is one in which a carrier signal is amplitude modulated by a signal proportional to the pressure sensed. The carrier signal is supplied to the transducer 174 by an oscillator 176, which may be of the conventional phase shift RC transistorized oscillator. The output of the transducer 174 is demodulated by a demodulator 178.

The demodulated signal, which is a positive D-C signal proportional to the pressure, is applied through a D-C amplifier 180 to the input of the differential amplifier which is not connected to the clamp circuit 164. The D-C amplifier, which may be a conventional emitter follower, references the signal to a negative voltage such that at zero pressure the feed-back voltage is highly negative and at full pressure the feed-back voltage is still slightly negative. More pressure than is available would be required to provide a zero feed-back signal. The slightly negative voltage is preferably only sufficient to keep the control valve 12 partially open in the pressurizing direction. This causes the operational amplifier without other input signals, to put out an output signal which fully pressurizes the system. Thus, the seismic source always rests just at its fully pressurized state as the servo control system 20 tries to zero its summed inputs, thereby ensuring that the full force swing of the seismic source is always available.

To improve the stability of the servo control, a signal proportional to the time derivative of the pressure signal is coupled to the differential amplifier. In this connection, the output of the D.-C. amplifier 180 is applied through a time derivative circuit 182 to the input of the operational differential amplifier 162 which is coupled to the clamp circuit 164. The time derivative circuit 182 includes a differentiating circuit 184 connected to the input of a conventional A.-C. amplifier 186. The output of the A.-C. amplifier 186 is connected through a potentiometer 188 to the input of the operational differential amplifier which is coupled to the clamp circuit 164.

The above described servo control system provides stable control of the valve up to its 90° phase shift point. For valves of suitable flow ratings which are commercially available the phase shift occurs at about 100 to 120 c.p.s. Also, the control system heavily emphasizes the high frequency response to thereby optimize the seismic source performance in the upper end of its frequency range.

As can be seen from the foregoing, an apparatus is provided which provides a versatile control for an array of seismic sources. In this connection, the apparatus provides a signal to the seismic sources which is adjustable in frequency and number of pulses. The seismic sources can be operated in synchronism or the operation of each of the seismic sources can be delayed for a desired period of time relative to other seismic sources.

The control apparatus as herein described has particular utility in the geophysical prospecting methods and apparatus shown and described in the copending application of Park H. Miller, Jr., Dwight C. Pound and Herschel R. Snodgrass, filed July 13, 1964 for Seismic Prospecting Ser. No. 382,086 and in the co-pending application of Herschel R. Snodgrass filed July 13, 1964 for Seismic Prospecting Ser. No. 382,108. The desired frequencies may be attained by the adjustment of variable resistors 110, and each particular respective frequency may be selected by selector switch 114 of the frequency control circuit 108. The length of each wave train may be set by adjustment of counter 136 to count a preselected number of pulses. The onset time of each wave train may be determined by means 134 in the manner described above; that is, means 134 may receive a reference datum pulse from the seismic recorder and delay initiation of the wave train by a time determined by a multivibrator or clock. Where the apparatus is used in conjunction with the method and apparatus shown and described in the aforesaid Miller et al. application for Seismic Prospecting, it is desirable that the wave trains at each frequency be of substantially the same length and terminate at a predetermined time after the reference datum. This requires a separate delay of onset time for each frequency. This time delay required at each frequency may be predetermined by empirical means as set forth in the Miller et al. application, and the proper adjustment may then be made in the delay mechanism for each frequency; this may be conveniently done by switching the timing circuits of the multivibrator or clock in a conventional manner. The required delay between sources may be adjusted by adjustment of the timing circuits of the monostable multivibrators 144 and 158.

Various changes and modifications may be made in the above described control apparatus without deviating from the spirit or scope of the invention. Various features of the invention are set forth in the appended claims.

What is claimed is:

1. Apparatus for controlling the operation of a plurality of seismic sources comprising signal generating means for generating a signal having a predetermined frequency and a predetermined number of cycles, said signal generating means including means responsive to a start signal for generating a wave having a predetermined frequency, and counting means for counting the number of cycles of said wave and stopping means responsive to said counting means for stopping said wave after a predetermined number of cycles to produce said generated signal; a plurality of delay means coupled to said signal generating means for delaying said generated signal for predetermined lengths of time each less than the duration of said signal to produce a plurality of signals each identical with said generated signal and overlapping in time; and means coupled to each of said delay means for applying each of said identical signals to a respective one of said seismic sources, the amounts of delay provided by each of said delay means being such that the seismic waves generated by said array of sources are formed into a beam.

2. Apparatus for controlling the operation of a plurality of seismic sources comprising signal generating means responsive to a start signal, said generating means including means responsive to said start signal for generating a wave having a predetermined frequency, counting means for counting the number of cycles of said wave, and stopping means responsive to said counting means for stopping said wave after a predetermined number of cycles to produce a generated signal; a plurality of means coupled to said signal generating means for delaying said generated signal for predetermined lengths of time to produce a plurality of signals each identical with said generated signal and with predetermined cycles of each at a predetermined time relative to said start signal; and means coupled to each of said delay means for applying each of said identical signals to a respective one of said seismic sources, the amount of delay provided by each of said delay means being such that the seismic waves generated by said array of sources are formed into a beam.

3. Apparatus for controlling the operation of an array of seismic sources comprising means for generating pulses of a predetermined frequency and number, means coupled to said pulse generating means for applying said pulses to one of the seismic sources, delay means associated with each of the other seismic sources and coupled to said pulse generating means for delaying pulses a preselected length of time, said delay means including a full wave rectifier means for converting the pulses into discrete pulses all of the same polarity and one for each transition of the pulse, a monostable multivibrator having an adjustable time of return to its initial stable state and coupled to said rectifier means so as to be switched to its unstable state for each discrete pulse applied thereto, a first bistable multivibrator selectively coupled to said monostable multivibrator and switching states for each return transition of the output signal of the monostable multivibrator, a pair of balanced monostable multivibrators coupled to the output of said first bistable multivibrator so as to switch to unstable states of operation on opposite transitions of the output signal of the first bistable multivibrator and having an adjustable time of return to their initial stable states, means coupled to the outputs of the balanced monostable multivibrators for combining the output signals therefrom, and a second bistable multivibrator selectively coupled to either the output of said monostable multivibrator or the output of said combining means so as to switch states of operation on each return transition of the input signal thereto, and means coupling the output signal of said second bistable multivibrator to said associated seismic source, the length of delay provided by each delay means being adjusted so that the seismic waves generated by said array of sources are formed into a beam.

4. Apparatus for controlling the operation of an array of seismic sources comprising pulse generating means including a first bistable multivibrator, a relaxation oscillator having its output coupled to said bistable multivibrator so as to trigger the same whenever said relaxation oscillator switches state, and having an adjustable timing circuit which controls the switching of said relaxation oscillator, a transistor switch coupled to said timing circuit for deenergizing the same when said bistable multivibrator is in a preselected state of operation, a second bistable multivibrator having its output coupled to said switch to operate said switch when a start pulse is applied to the input thereof, a counter connected to the output of said first bistable multivibrator for providing an output signal when a preselected number of pulses are generated by said first bistable multivibrator, said output signal being coupled to said second bistable multivibrator to switch states thereof and close said switch, a plurality of adjustable delay means coupled to the output of said first bistable multivibrator for delaying said output for a predetermined time, one delay means associated with each seismic source, and means coupling each delay means to its associated seismic source.

5. Apparatus for controlling the operation of an array of seismic sources each of which is actuated by hydraulic pressure, said apparatus comprising pulse generating means including a first bistable multivibrator, a relaxation oscillator having its output coupled to said first bistable multivibrator so as to trigger the same whenever said relaxation oscillator switches state, and having an adjustable timing circuit which controls the switching of said relaxation oscillator, a transistor switch coupled to said timing circuit for deenergizing the same when said bistable multivibrator is in a preselected state of operation, a second bistable multivibrator having its output coupled to said switch to operate said switch when a start pulse is applied to the input thereof, and a counter connected to the output of said first bistable multivibrator for providing an output signal when a preselected number of pulses are generated by said first bistable multivibrator, said output signal being coupled to said second bistable multivibrator to switch states thereof and close said switch, delay means associated with each of the seismic sources and coupled to the output of said pulse generating means for delaying pulses therefrom a preselected length of time, said delay means including a full wave rectifier means coupled to the output of said first bistable multivibrator for converting the pulses into discrete pulses all of the same polarity and one for each transition of the pulse, a first monostable multivibrator having an adjustable time of return to its initial stable state and coupled to said rectifier means so as to be switched to its unstable state for each discrete pulse applied thereto, a third bistable multivibrator selectively coupled to said first monostable multivibrator and switching states for each return transition of the output signal from said first monostable multivibrator, a pair of balanced monostable multivibrators coupled to the output of said third bistable multivibrator so as to switch to unstable states of operation on opposite transitions of the output signal of the third bistable multivibrator and having an adjustable time of return to their initial stable states, means coupled to the outputs of the balanced monostable multivibrators for combining the output signals therefrom, and a fourth bistable multivibrator selectively coupled to either the output of said first monostable multivibrator or the output of said combining means so as to switch states of operation on each return transition of the input signal thereto, and means coupling the output signal of said second bistable multivibrator to said associated seismic source, said coupling means including an electrically actuated hydraulic valve for controlling the pressure applied to the source, a summing circuit having a first input coupled to the output of said generating means and a second input coupled to the output of said pressure transducer means, said summing circuit comparing the input signals and providing an output signal related thereto, means for applying the output signal of said summing circuit to said valve, and a feedback circuit responsive to the rate of change of the signal provided by said pressure transducer and having the output thereof coupled to one of the inputs of said summing circuit.

References Cited

UNITED STATES PATENTS

| | | | |
|---|---|---|---|
| 2,745,507 | 5/1956 | Bodine | 181—0.5 |
| 2,955,460 | 10/1960 | Stevens et al. | 181—0.5 |
| 3,022,851 | 2/1962 | Hasbrook | 181—0.5 |
| 3,066,754 | 12/1962 | Johnson | 181—0.5 |
| 3,216,525 | 11/1965 | Fail et al. | 181—0.5 |

BENJAMIN A. BORCHELT, *Primary Examiner.*

M. F. HUBLER, *Assistant Examiner.*